(12) United States Patent
Decker (10) Patent No.: US 7,584,586 B2
(45) Date of Patent: Sep. 8, 2009

(54) BRACKET FOR INSTALLATION OF CEILING PANELS

(76) Inventor: Selden M. Decker, 2330 Heston St. No. 2, Abington, PA (US) 19001

( * ) Notice: Subject to any disclaimer, the term of this patent is extended or adjusted under 35 U.S.C. 154(b) by 234 days.

(21) Appl. No.: 11/599,209

(22) Filed: Nov. 14, 2006

(65) Prior Publication Data
US 2008/0110107 A1    May 15, 2008

(51) Int. Cl.
*E04G 23/00*    (2006.01)
*E04G 21/00*    (2006.01)
*E02B 1/00*    (2006.01)
*E04G 21/14*    (2006.01)

(52) U.S. Cl. .................. 52/747.1; 52/745.06; 52/127.2; 414/11; 269/43; 248/351

(58) Field of Classification Search ................ 52/127.2, 52/749.1, 745.05, 745.06, 747.1; 248/544, 248/561, 351, 228, 235; 33/646, 648; 182/82; 414/11
See application file for complete search history.

(56) References Cited

U.S. PATENT DOCUMENTS

| | | | |
|---|---|---|---|
| 5,163,799 A * | 11/1992 | Lynn | ............................ 414/11 |
| 6,131,361 A | 10/2000 | Murphy | |
| 6,161,824 A * | 12/2000 | Gustavson | .................. 269/43 |
| 6,364,404 B1 | 4/2002 | De Paoli | |
| 6,467,236 B1 | 10/2002 | Schlegel | |
| 6,904,732 B1 | 6/2005 | Richmond | |

* cited by examiner

*Primary Examiner*—Robert J Canfield
*Assistant Examiner*—Babajide Demuren
(74) *Attorney, Agent, or Firm*—Howson & Howson LLP (57) ABSTRACT

A ceiling panel installation bracket has first and second flanges, and is alternatively attachable to an overhead joist or to a vertical surface of a top plate spanning a set of wall studs. The bracket has a hinged flange to which an elongated, oblique, floor-engaging, panel support can be secured. Two assemblies, each consisting of a bracket and an elongated panel support are used in laterally space relationship to guide a ceiling panel into place. Retractable stops provided on the oblique supports are used to support a ceiling panel temporarily.

4 Claims, 8 Drawing Sheets

BRACKET FOR INSTALLATION OF CEILING PANELS

FIELD OF THE INVENTION

This invention relates to a novel bracket for use in the installation of ceiling panels in buildings.

BACKGROUND OF THE INVENTION

Ceiling panels are typically composed of a layer of gypsum sandwiched between two layers of heavy paper. The panels are the same as the gypsum panels used in the construction of walls, known variously as "wallboard," "drywall," etc. The panels are typically supplied in four foot by eight foot sections, having a thickness of ½ inch or ⅝ inch. Gypsum panels are available in various other dimensions and thicknesses.

A ½ inch, 4×8 foot panel weighs approximately 50 pounds, and a ⅝ inch, 4×8 foot panel weighs approximately 70 pounds. Because of their weight and unwieldy size, it has been nearly impossible for a single individual to install gypsum ceiling panels without assistance. Ceiling panels are therefore usually installed by several individuals working together, frequently with the aid of a floor-mounted drywall supporting jack that can hold a panel in a horizontal condition and lift it into place against the ceiling joists to which it is to be attached. Attachment is usually carried out by the use of drywall screws or nails, and, optionally, an adhesive may be used to cement the panels to overhead joists to reduce vibration.

Various devices have been proposed for assisting installers in lifting and securing ceiling panels. U.S. Pat. Nos. 6,131,361, 6,161,824, 6,364,404, 6,467,236, and 6,904,732, for example, describe various brackets that can be attached temporarily to ceiling joists, to wall studs, or to top plates for guiding ceiling panels into place and supporting the ceiling panels while they are being secured to overhead joists. In U.S. Pat. No. 6,161,824, for example, a pair of brackets can be attached temporarily to a plate at the top of a set of wall studs. When the brackets are in place, their ceiling panel supporting surfaces are situated a sufficient distance below overhead ceiling joists to accommodate a ceiling panel. An edge of the ceiling panel is then inserted into the space between the bracket and the overhead joists. The opposite edge of the ceiling panel is then lifted and the ceiling panel is slid into place and attached to the joists.

Even when the above-described brackets are used, it is difficult for a single individual to install a ceiling panel. A skilled individual can lift a 50 pound, or even a 70 pound, ceiling panel and insert one of its edges into the space between supporting brackets and the overhead joists. However, to prevent the panel from falling off the brackets, it is necessary, while raising the opposite edge up to the ceiling joists, to support the panel in such a way as to prevent it from slipping off the brackets. Otherwise, it will fall to the floor, and almost certainly sustain enough damage to require replacement. Moreover, since the ceiling joists are usually about eight or nine feet from the floor, it is necessary for most individuals to use a ladder to attach the panel to the joists. The installer must hold the panel in place while climbing a ladder.

Needless to say, after installation of just a few ceiling panels in this manner, a single individual can quickly become physically exhausted.

BRIEF SUMMARY OF THE INVENTION

In accordance with a first aspect of the invention an improved bracket is used in pairs, each bracket cooperating with an elongated member that extends obliquely from the bracket to the floor. The elongated members, which can be formed from lengths of conventional 2×3 or 2×4 wooden board, provides added support to the brackets, while acting as extended guides for the ceiling panel, preventing the panel from falling to the floor and being damaged if it accidentally slips off the brackets.

A preferred bracket in accordance with the invention comprises three flanges. A first flange is adapted for attachment to a vertical wall-supporting surface, and has a portion with at least one hole through which a fastener can extend for securing the bracket to the vertical wall-supporting surface. A second flange has a first panel-supporting portion meeting the first flange and extending substantially perpendicularly therefrom, and a second, curved, panel-supporting portion extending from the first portion at a location spaced from the first flange, the curved panel-supporting portion being curved in the same direction in which the portion of the first flange having the fastener hole extends from the first panel-supporting portion. The first panel-supporting portion of the second flange has at least one hole through a fastener can extend to secure the bracket to an overhead ceiling support member. A third flange, connected to the bracket, has at least one hole through which a fastener can extend for securing the third flange to an oblique supporting member extending from the bracket to a floor.

Preferably, the third flange extends from the bracket at an acute angle relative to the first flange and also at an acute angle relative to the first panel-supporting portion of the second flange.

In a preferred embodiment, the third flange is connected to the bracket by a hinge having a hinge axis extending parallel to the direction of a straight line along which the first and second flanges meet.

The curved portion of the second flange can comprise a curved member that can extend downward past an oblique supporting member attached to the third flange. However, the curved portion preferably comprises a pair of curved members spaced from each other by a distance sufficient to allow an oblique supporting member attached to the third flange to extend between them.

In accordance with another aspect of the invention, the bracket comprises a first flange for attachment to a vertical wall supporting surface, a second, ceiling panel-supporting, flange connected to the first flange and extending substantially perpendicularly therefrom, and a third flange, connected to the bracket by a hinge, for attachment to an oblique supporting member. The hinge axis is horizontal when the first flange is attached to a vertical wall-supporting surface and the ceiling panel-supporting flange is in position to support a ceiling panel.

In accordance with still another aspect of the invention, a ceiling panel support comprises a pair of brackets, each bracket having a vertical flange for attachment to a vertical wall supporting member, and a horizontal support for supporting a ceiling panel. A pair of elongated ceiling panel supporting members is provided, one supporting member being attached to each bracket and extending therefrom obliquely to a floor. The supporting members having upper faces on which a ceiling panel can slide. The upper faces lie substantially in a common plane so that the supporting members are disposed substantially entirely on one side of the common plane. Each bracket has at least one curved member connected to its horizontal support, and each curved member of each bracket extends, through the common plane, downward adjacent a side of the supporting member attached thereto for guiding a ceiling panel onto the horizontal supports of the brackets.

Preferably, each bracket has a pair of curved members connected to its horizontal support, the curved members of each bracket extending downward on opposite sides of the supporting member attached thereto for guiding a ceiling panel onto the horizontal supports of the brackets.

In accordance with still another aspect of the invention, the ceiling panel support has a pair of stops secured respectively to the pair of supporting members at intermediate locations between the brackets and the floor. The stops are substantially at the same height, and each stop comprises a base secured to its supporting member and disposed substantially entirely on the side of the common plane on which the supporting members are situated. Each stop also includes a panel-engaging member pivoted on its base, the panel engaging member being movable from a first position in which it extends through the common plane for engagement with a panel supported on the supporting members, to a second position in which it lies substantially entirely on said one side of the common plane. Each base includes a limit for preventing movement of the panel engaging member from its second position past its first position so that the pivoted panel-engaging member can support a panel and prevent the panel from sliding downward along the elongated supporting members. The panel-engaging members of the stops can be urged toward their first, or projecting, positions by springs or by gravity.

Another aspect of the invention is a method of installing a ceiling panel comprising the following steps, which are not necessarily sequential. One step is arranging at least two elongated members so that they extend obliquely, and in parallel relationship to one another, from a floor to a height underneath, but in close proximity to, a height at which a ceiling panel is to be installed. Another step is to providing a panel supporting surface at the upper end of each of said elongated members. Another step is to secure the elongated members to a previously erected structure at locations adjacent said height. The ceiling panel to be installed is slid upward along the elongated members, with a face of the panel in contact with the elongated members. An upper edge of the panel is moved to a location above the aid panel supporting surfaces, and the panel is tilted upward until it is horizontal and at the height at which it is to be installed. During, or following, the tilting step, the panel is moved so that said upper edge slides along the panel supporting surface to a final position, at which the panel is secured panel to an overhead support structure.

In the installation process, the ceiling panel may be supported on the elongated members by projections attached to the elongated members and in engagement with a lower edge of the panel.

In using the brackets according to the invention, an installer will typically attach an elongated support to each of a pair of brackets so that the support forms an acute angle with both of the substantially perpendicular flanges of the bracket. The elongated support will be typically about 11 feet long in order to lie at an approximately 45° angle when extending to a floor from a bracket at a height of about 8 feet. The supports can be lengths of 2×3 or 2×4 boards, and the upper end of each support should be cut at an angle of about 45° so that the cut end itself can support an edge of a ceiling panel before the edge moves onto the bracket. The installer then attaches the pair of brackets to a wooden plate spanning the upper ends of a series of wall studs so that the brackets are spaced from each other by a distance less than the long dimension (typically 8 feet) of the ceiling panel to be installed.

The installer can then place the ceiling panel against the obliquely disposed elongated supports, and slide it up the supports until its upper edge passes the ends of the supports. Since the ceiling panel rests on the oblique supports, it can be held in position easily until the installer is on a ladder and in a position to raise the lower edge of the panel toward the ceiling joists and push the panel so that it passes from the oblique supports, onto the downwardly curved portions of the brackets, and from there onto the horizontal panel-supporting portions of the brackets. The installer can then attach the panel to the ceiling joists using drywall screws.

If pivoting stops are provided on the elongated panel-supporting members, the ceiling panel can be slid upwardly over the retracted stops, which are preferably spaced from the upper ends of the elongated members by a distance slightly greater than the shorter dimension of the panel, e.g. 4 feet in the case of a 4×8 foot panel. When the panel passes the stops, the stops automatically extend, and the panel can be supported temporarily on the stops without the need for the installer to continue to hold it. The installer can then reposition the ladder if necessary, climb the ladder, gain a firm footing on the ladder, and then grasp the lower edge of the panel to lift it, push it into place, and attach it to the ceiling joists.

The invention enables a single individual to install heavy and bulky ceiling panels easily and rapidly, and with less fatigue. The invention also reduces the possibility that a panel will fall off a supporting bracket and fall to the floor, sustaining irreparable damage.

Other details and advantages of the invention will be apparent from the following detailed description when read in conjunction with the drawings.

DETAILED DESCRIPTION OF THE PREFERRED EMBODIMENT

Figure 1:
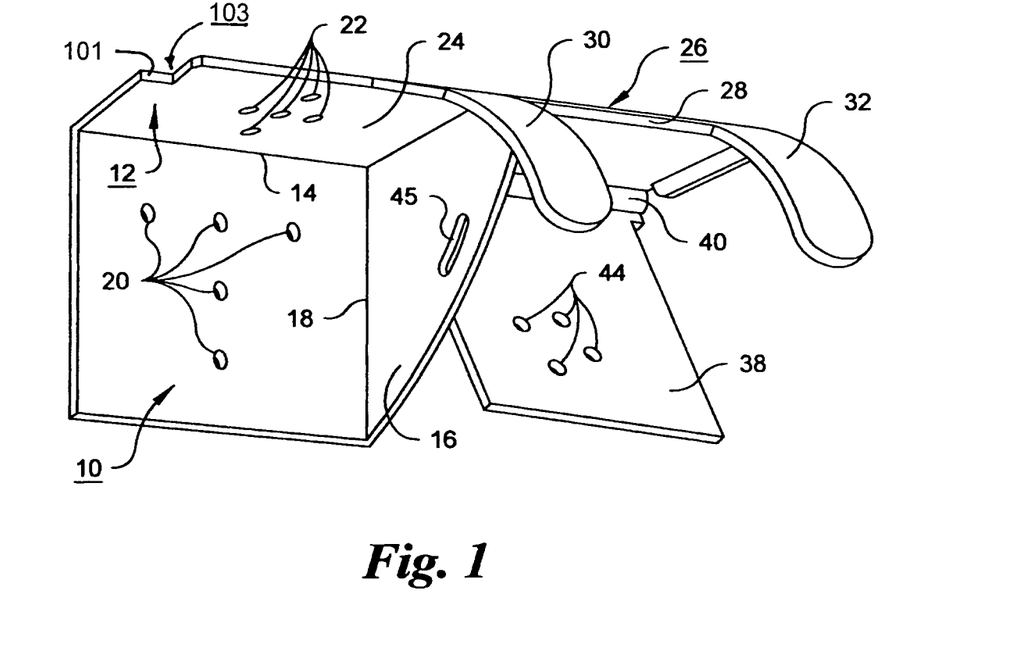
FIG. 1 is a perspective view of a preferred ceiling panel installation bracket according to the invention, as viewed from the front and left, and below the horizontal panel-supporting portion.
Figure 2:
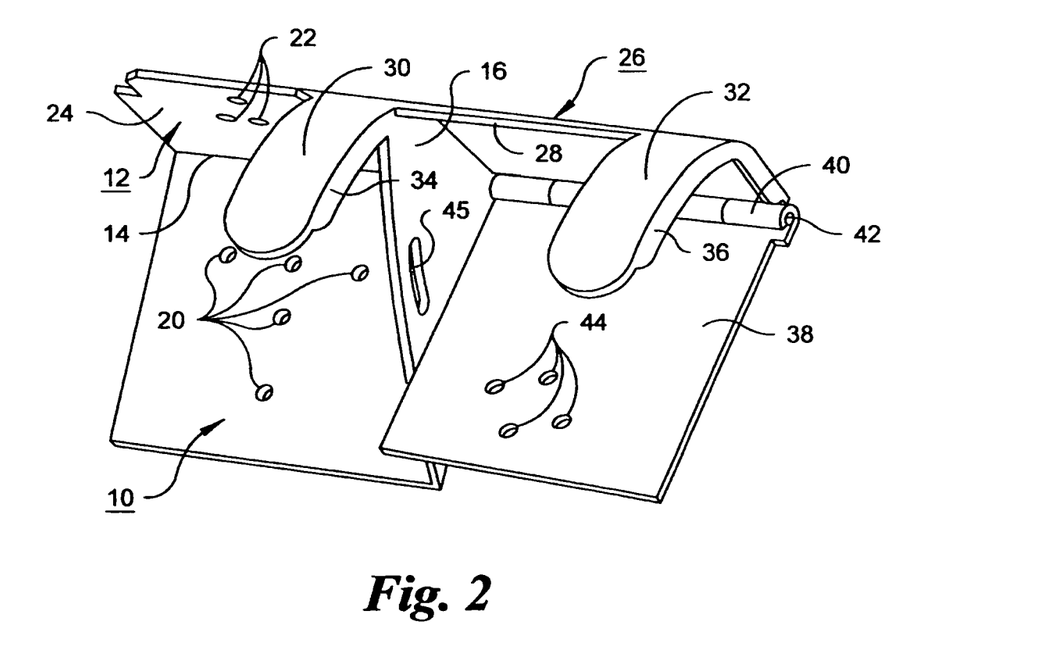
FIG. 2 is a perspective view of the bracket of FIG. 1 as viewed from the front and right, and below the horizontal panel-supporting portion.
Figure 3:
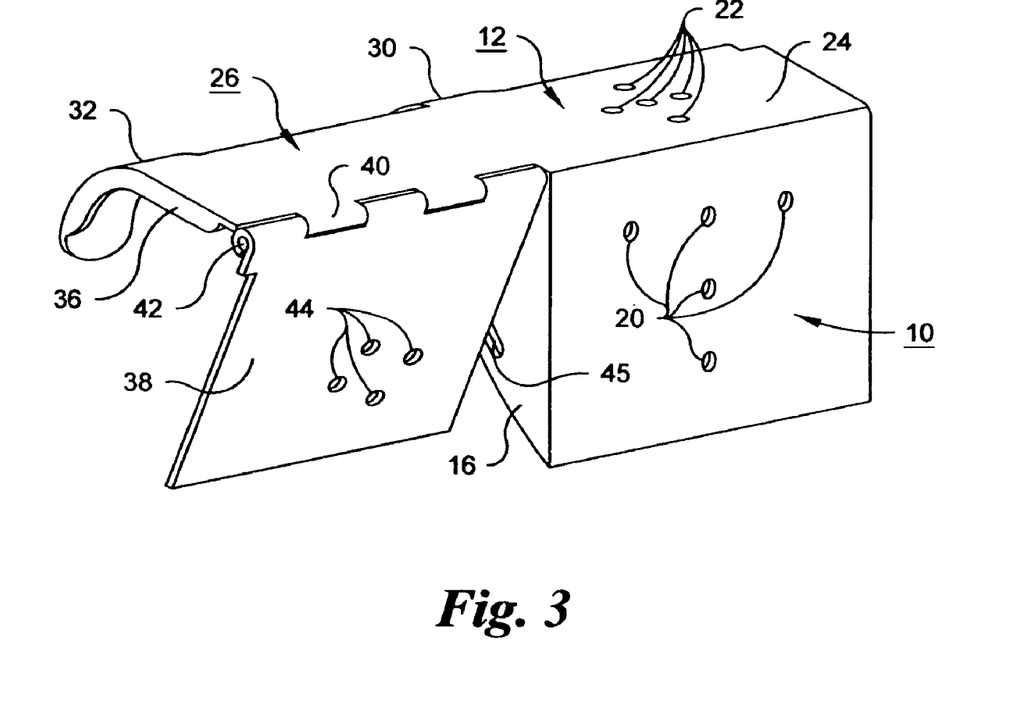
FIG. 3 is a perspective view of the bracket of FIGS. 1 and 2, as viewed from the rear and right, and above the horizontal panel-supporting portion.

Referring first to FIGS. 1-3, the bracket in accordance with the invention is preferably fabricated from steel sheet having a thickness in the range from about 10 to 14 gauge. The preferred bracket comprises a first flange 10 and a second flange 12 that meet substantially perpendicularly at a bend line 14. The first and second flanges are reinforced by a generally triangular gusset 16, which extends from a right hand edge 18 of flange 10 to an intermediate part of flange 12.

Flange 10 has an array of mounting holes 20, through which dry wall screws or similar fasteners can extend for securing the bracket to a vertical supporting surface. Flange 12 has an array of mounting holes 22, through which dry wall screws or similar fasteners can extend for securing the bracket to a horizontal overhead surface such as a ceiling joist.

Flange 12 has a first portion 24 that meets flange 10 substantially perpendicularly, and a downwardly curved portion 26 that extends from the first portion 24 at a location spaced from flange 10. The curved panel-supporting portion is curved in the same direction in which the portion of the first flange having holes 20 extends from the first panel-supporting portion 24 of the second flange.

The curved portion 26 has an edge 28 below the level of the bottom face of portion 24. This edge 28 ensures that the upper end of an elongated, oblique, supporting member cannot be so close to a ceiling joist that a ceiling panel cannot be slid into place between the bracket and the joist.

The curved portion 26 includes two downwardly curved members 30 and 32, which extend beyond, and downwardly from, edge 26. Member 30 is reinforced by a rib 34 which extends along its right side as a continuation of gusset 16 and as an integral part of member 30. Member 32 is similarly reinforced by a rib 36. The curved members are preferably separated from each other by a distance sufficient to enable the narrow dimension of 2×3 or 2×4 board to fit between them, i.e. slightly more than 1½ inch.

As will be apparent especially from FIGS. 1 and 2, the bracket is divided into left- and right-hand parts by the gusset 16. The upper flange 12 extends the full width of the bracket, while flange 10 is located to the left of the gusset. To the right of the gusset is an third, oblique, flange 38, which is preferably connected to the right-hand part of flange 12 by a hinge 40, the knuckles of which can be formed from extensions of flanges 12 and 38. The knuckles of the hinge receive a hinge pin 42, which establishes a hinge axis that is at least parallel to, and preferably aligned with, bend line 14.

Flange 38 is provided with a set of holes 44 for fasteners by which the flange can be secured to the upper end of an elongated support member. Gusset 16 is provided with an elongated, curved slot 45 for receiving a screw used to lock the elongated supporting member in fixed relationship to the bracket.

Figure 4:
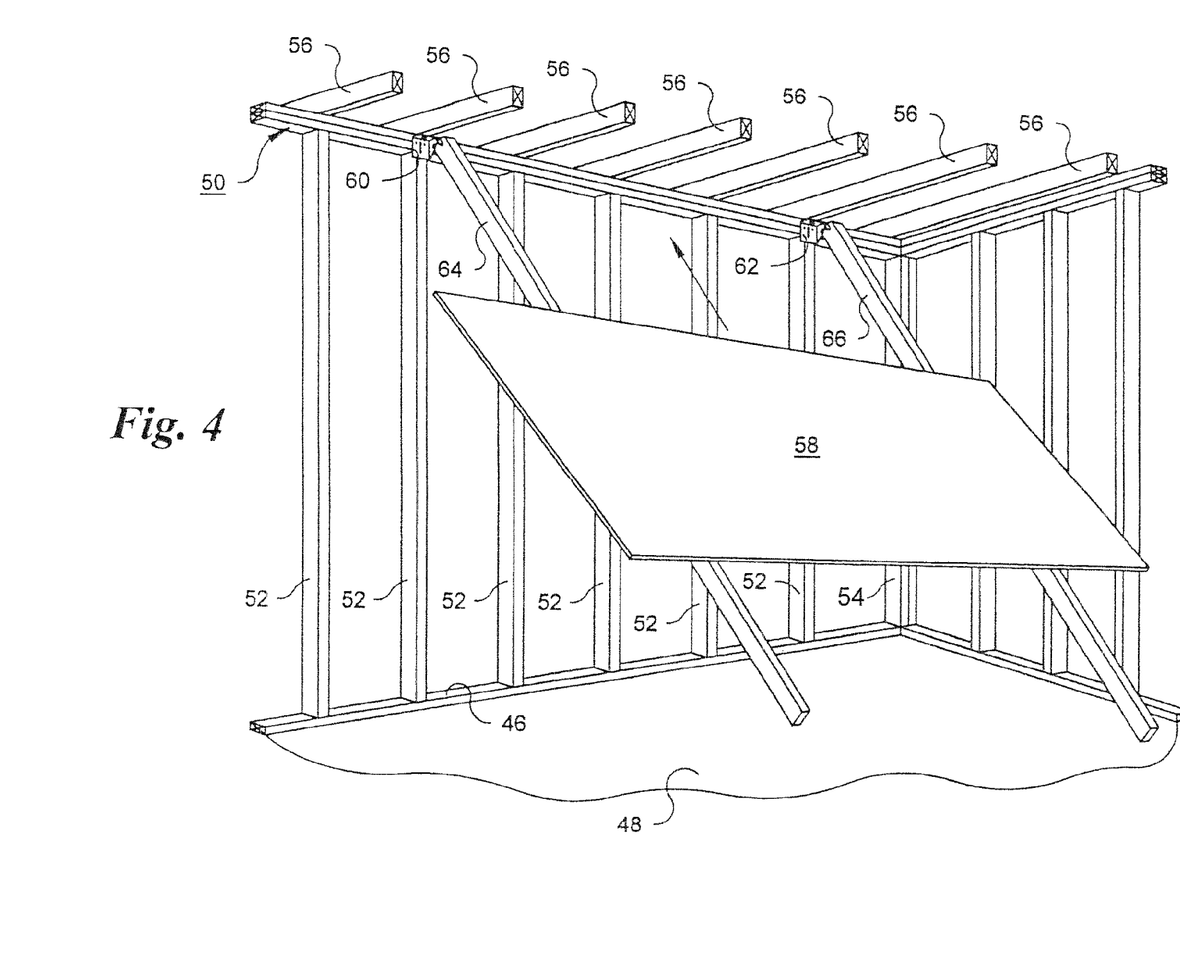
FIG. 4 is a perspective view illustrating an intermediate stage in the installation of a ceiling panel using a pair of installation brackets according to the invention.

FIG. 4 shows the frame of a room, the frame being of conventional construction and comprising the frames of a pair of walls that meet perpendicularly. A first wall frame comprises a bottom plate 46 on a floor 48, a top plate 50 (consisting of two boards, one on top of the other, a set of vertical studs 52 and a corner post 54. The other wall frame is similar. Ceiling joists 56 extend horizontally and perpendicularly from the top plate 50, preferably being spaced at a standard center-to-center distance of sixteen inches so that edges of an eight foot ceiling panel such as panel 58 can be aligned with two joists having five joists and six spaces between them.

As seen in FIG. 4, two brackets 60 and 62, each corresponding to the bracket of FIGS. 1, 2 and 3, are attached to the top plate 50 at a spacing less than the length of the long dimension of panel 58. For example, in the case of an eight foot panel, the brackets can be spaced from each other, as shown, by a distance corresponding to the 5 foot 4 inch center-to-center distance from a second stud to a fifth stud. Oblique, elongated, supporting members 64 and 66 are fastened to the hinged flanges of the brackets by screws, and extend obliquely downward to the floor 48. The ceiling panel 58 is shown supported on the co-planar upper surfaces The angle of the elongated members depends on the distance of the ceiling joists from the floor and the length of the oblique members. In the case of an eight foot ceiling, and eleven foot oblique members, the angle will be slightly steeper than 45°. In most cases an approximately 45° angle will be adequate. Longer oblique members will, of course, make it easier to slide the ceiling panel upward, and shorter oblique members will make it more difficult to do so.

Figure 4A:
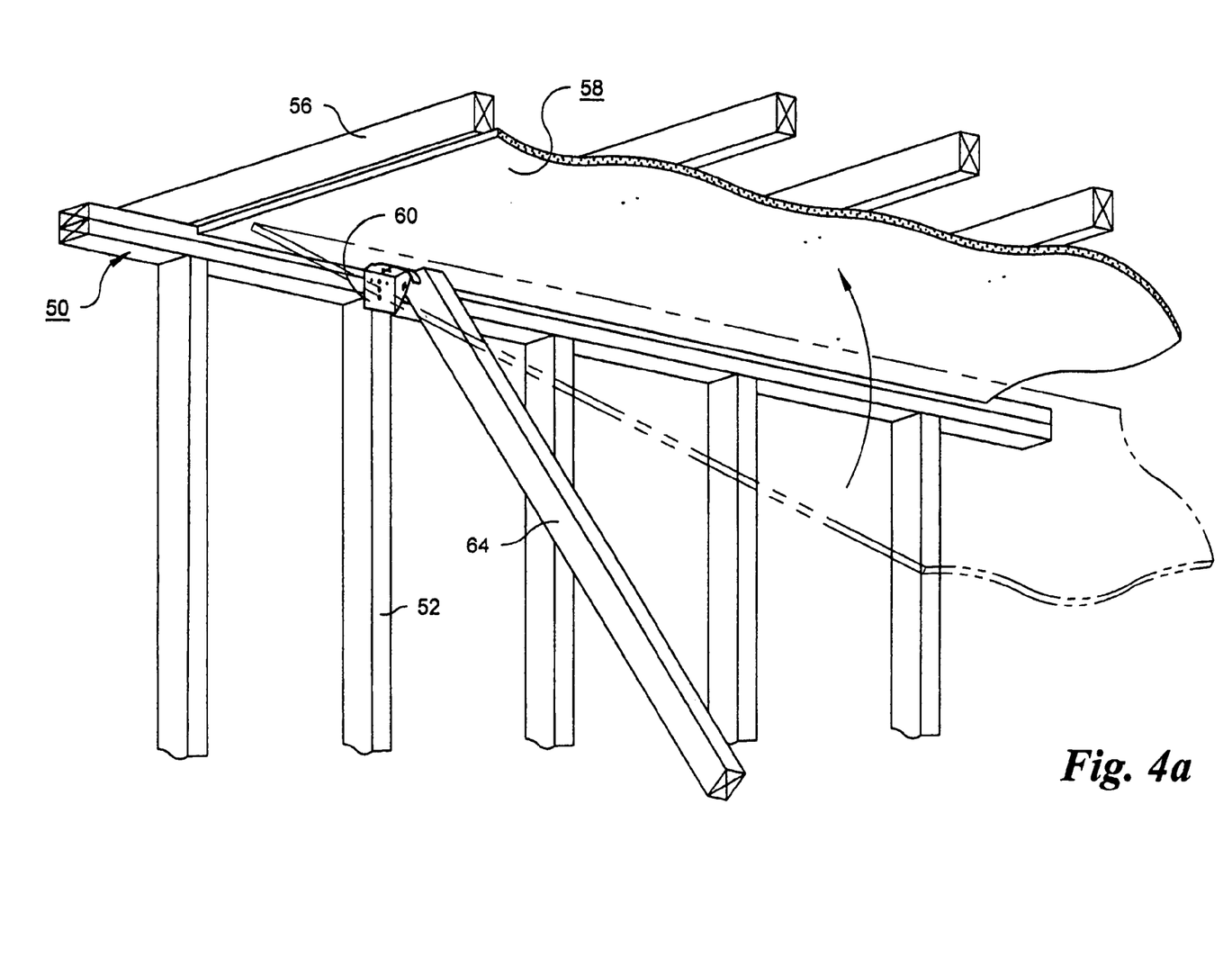
FIG. 4a is a perspective view illustrating a later stage in the installation of a ceiling panel.

As shown in FIG. 4a, after the ceiling panel is moved upward along the oblique members into the position shown by broken lines, in which its upper edge extends beyond the upper ends of the oblique members, the panel can be tilted upward to a horizontal condition and slid across the tops of the brackets into place against the upper board of double plate 50. The ceiling panel 58 can then be secured to the ceiling joists 56 using drywall screws. When the ceiling panel is properly secured to the ceiling joists, the brackets can be removed from the plate 50 for reuse. The oblique supporting members can remain attached to the brackets when the brackets are removed from the plate.

Figure 5:
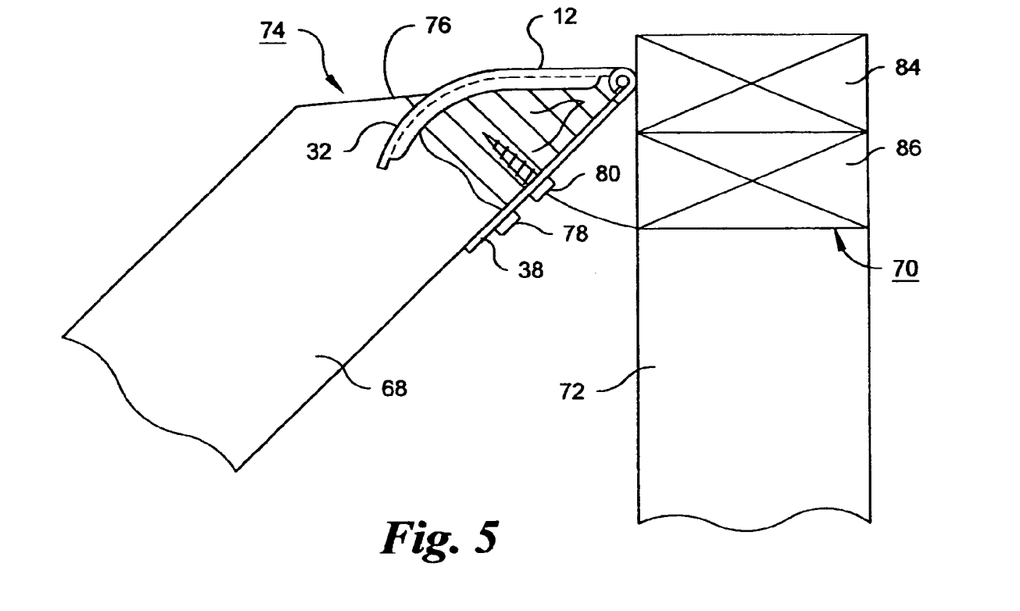
FIG. 5 is a right side elevational view, partly in section, showing the bracket, with an elongated oblique support attached to it, mounted on a vertical wall-supporting surface.
Figure 6:
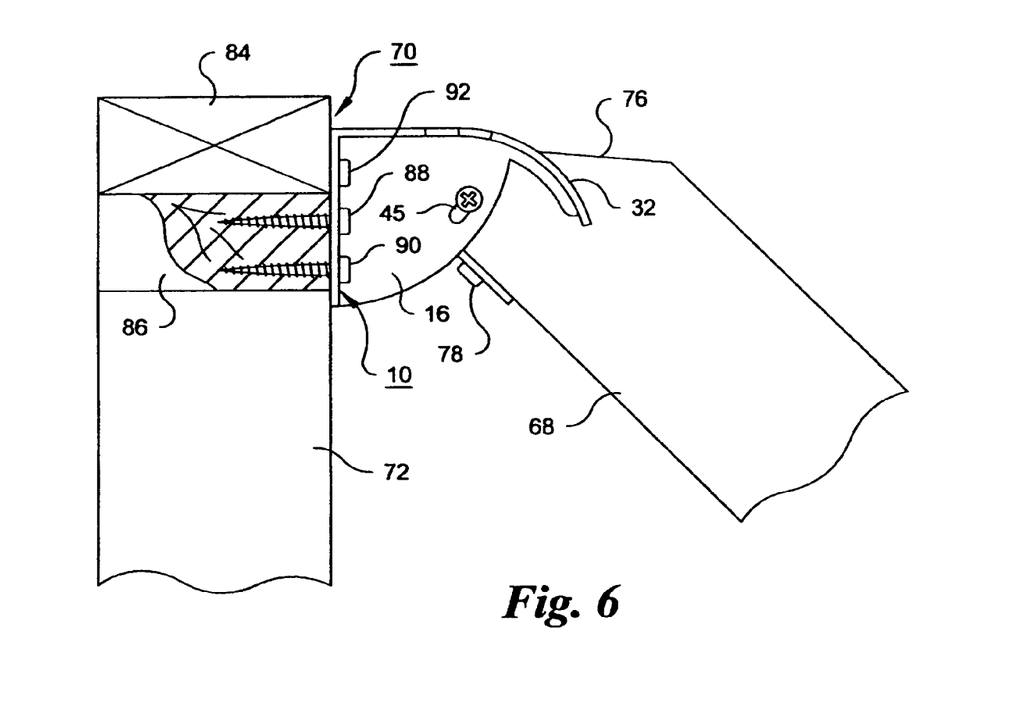
FIG. 6 is a left side elevational view, also partly in section, of the bracket, elongated oblique supporting member and vertical wall-supporting surface.

FIGS. 5 and 6 show in detail how the bracket of FIGS. 1, 2 and 3 is attached to an oblique supporting member 68 and to a top plate 70 spanning a series of vertical wall studs 72. A bevel 74, preferably a 45° bevel, is cut at the upper end of member 68, which in the case shown is a 2×4 length of wood. With the bevel, an end face 76 is formed at the upper end of member 68, and part of the end face extends underneath flange 12. The oblique member is secured to the hinged flange 38 by screws 78 and 80, and to gusset 16 by a screw 82, which extends through slot 45 in the gusset. The slot allows for adjustment of the angle of the oblique member so that it can engage the floor without straining the bracket or its fasteners. As shown in FIGS. 5 and 6, the curved parts 32 and 30 of the bracket extend downward on opposite sides of member 68

The top plate is a double plate consisting of two planks 84 and 86. As shown in FIG. 6, the bracket is secured to the lower plank 86 of the top plate by screws 88 and 90, and to the upper plank 84 by one or more screws, including screw 92. All of these screws extend through flange 10.

When a ceiling panel is pushed up along the oblique members, and its upper edge reaches the beveled end faces 76, the panel can be tilted and pushed toward the upper plank 84 of the top plate, across the beveled end faces 76 of the oblique members. As the panel is pushed across the end faces of the oblique members, it slides upward on the curved members 30 and 32 of the brackets, and moves onto the top flange 12. As soon as the installer fastens parts of the panel remote from the brackets to overhead joists by means of several drywall screws, it is no longer necessary to support the panel manually, and the fastening of the panel to the overhead joists can be completed easily. The brackets, with the oblique supports attached to them, can be removed from the top plate, and re-used for installing more ceiling panels, including intermediate panels, as shown in FIG. 7.

Figure 7:
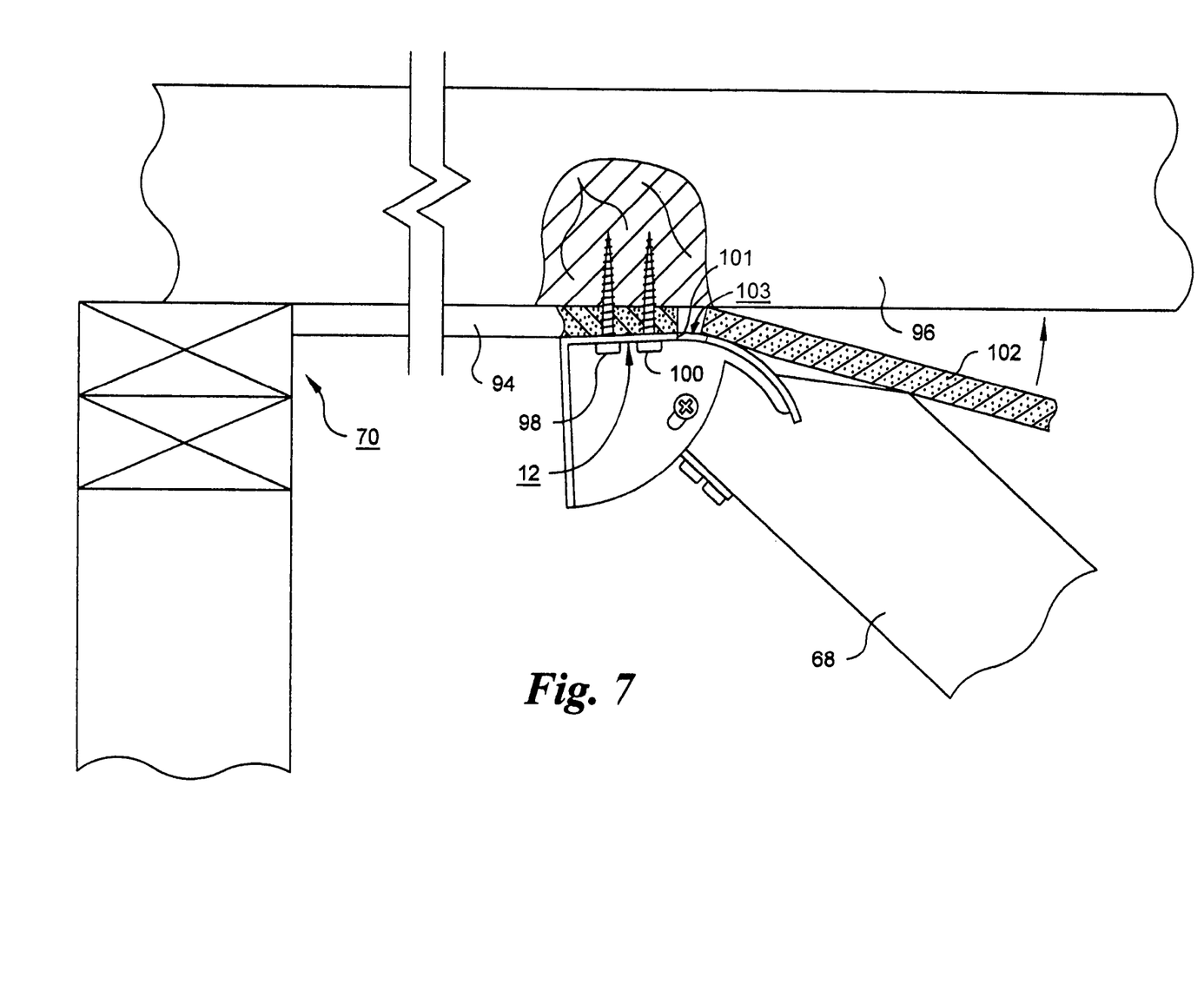
FIG. 7 is a left side elevational view, partly in section, showing the bracket attached to a ceiling joist and being used for the installation of a ceiling panel at a location spaced from a wall.

In FIG. 7, a first ceiling panel 94 is shown in place underneath a ceiling joist 96 and against a top plate 70. The bracket attached to oblique member 68 is then fastened to the ceiling joist 96 by screws 98 and 100, which extend through flange 12, and through panel 94. The edge 101 of a notch 103, formed at a corner of the upper flange 12, provides a convenient reference for positioning the bracket, and, when edge 101 is aligned with the edge of panel 94, the bracket is in proper relationship with the panel. Because panel 94 is provided with a taper to receive drywall compound the bracket will be raised slightly by tightening screws 98 and 100. However, since the next ceiling panel is also tapered, and the projecting part of the upper flange 12 is curved, the bracket will not interfere with the insertion of the next ceiling panel.

Two brackets, with attached oblique supports are secured by screws to separate ceiling joists in the manner illustrated in FIG. 7, with their oblique supports in parallel relationship. The next panel 102 is slid up along the oblique supports, tilted upward when it reaches the upper ends of the oblique supports, pushed into place and secured in the same manner as the first panel 94.

When only one more ceiling panel is required in order for the ceiling panels to span the entire length of the room in the direction of the ceiling joists, the final panel is installed in the same manner as the first panel, that is, in the manner depicted in FIGS. 4 and 4a.

Figure 9:
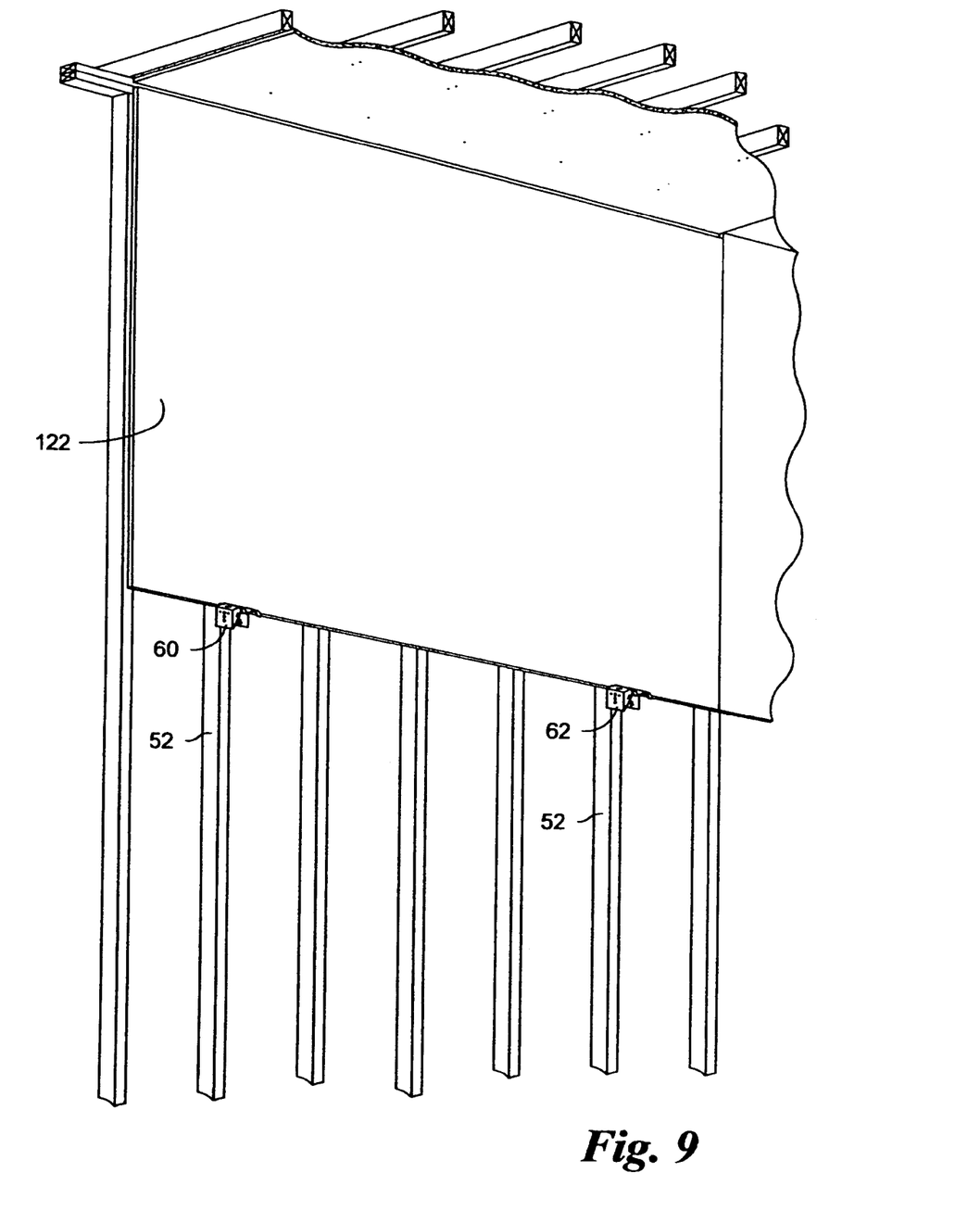
FIG. 9 is a perspective view illustrating the use of brackets according to the invention for temporary support of a wall panel.

When a ceiling panel is slid upward on two or more parallel oblique members, the panel can be held temporarily on stops mounted on the oblique members. One such stop, 104, shown in FIG. 9, is mounted on the side of an oblique member 105. The stop comprises a base 106, fastened to the side of the oblique member by screws 108 and 110, and a hook-shaped panel-engaging member 112, pivoted on a shaft 114 in the base. The hook-shaped, panel-engaging member is shown protruding beyond the upper side 116 of the oblique member, and resting against limit 118 of the base. The panel-engaging member 112 can be pushed into a retracted position by the panel as the panel slides over the surface 116 of the oblique member, but, when cleared by the panel, the panel-engaging member is returned to the position shown by a compression spring 120, or by gravity.

The stop 104 is preferably mounted on the oblique member at a distance, slightly greater than the smaller dimension of a panel, from the upper end of the oblique member. That is, if the smaller dimension of the panel is four feet, the stop can be mounted at about 4 feet, 2 inches from the upper end of member 105.

The stops on the oblique members protrude automatically when cleared by the panel, and hold the panel temporarily at an elevated position on the oblique members, enabling the installer to reposition a ladder if necessary, climb the ladder, gain a firm footing on the ladder, and then grasp the lower edge of the panel to lift it, push it into place, and attach it to the ceiling joists.

After a ceiling is installed, the brackets of the invention can also be conveniently used, without the oblique members attached to them, as temporary supporting brackets for upper wall panels as illustrated in FIG. 9. Two brackets, 60 and 62, are shown secured to upright studs 52, and supporting a wall panel 122 near its final position so that it can be adjusted and attached to the studs by drywall screws.

Various modifications can be made to the bracket described above, and to the ceiling panel support assembly comprising a bracket and an oblique panel-supporting member. In particular, although it is desirable to connect flange 38 to the upper flange 12 by means of a hinge in order to allow adjustment of the angle of the panel supporting member, many of the advantages of the invention can be realized in a modification in which the hinge is eliminated, and the flange 38 is rigidly connected to the upper flange, and, optionally, to the gusset 16.

Figure 8:
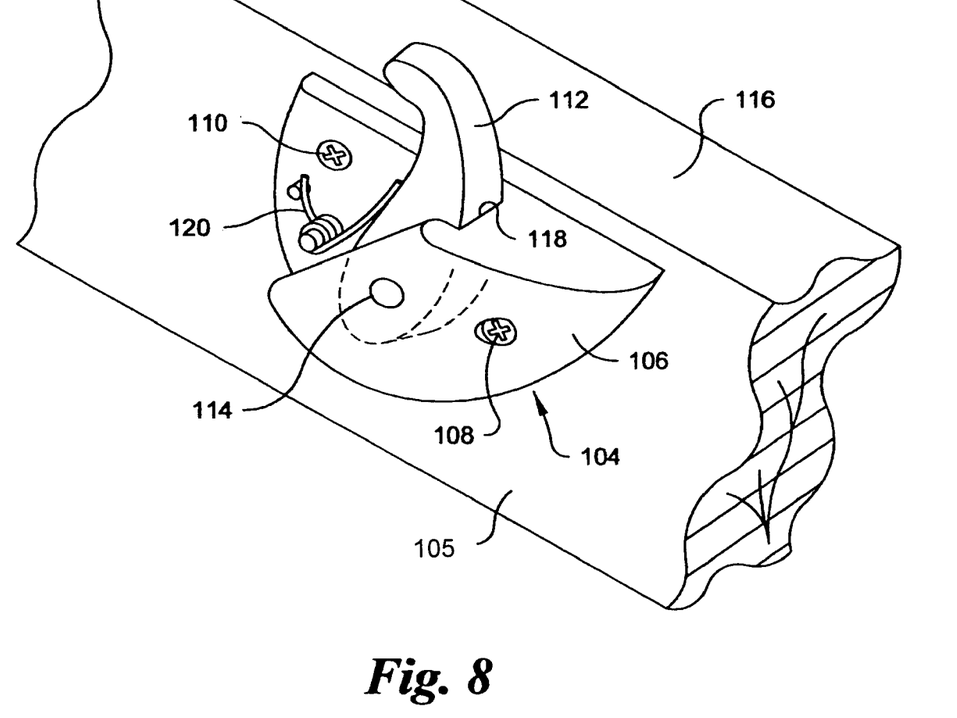
FIG. 8 is a perspective view showing a pivoting stop attached to an elongated, oblique, supporting member.

It is also possible to pivot eliminate the flange, and instead pivot an oblique, panel-supporting member to the bracket, using a bolt that extends through a hole in the gusset, and either through, or into, the oblique, panel-supporting member. In this case, the oblique member can be formed form a length of 2×3 or 2×4 wood, or, alternatively, the oblique member can be fabricated from metal or another material as a permanent component of the ceiling panel installation apparatus. The panel stops, corresponding to the stop shown in FIG. 8, can be built into the oblique member as a permanent part, and can also be made adjustable so that they can be moved to selected positions on the oblique members.

In still another modification of the bracket, although it is desirable to provide two curved members, one on each side of the oblique, panel-supporting member, a single curved member on one side of the panel-supporting member can be sufficient to guide a panel from the upper end of an oblique member onto the upper flange of the ceiling panel installation bracket.

Still other modifications may be made to the apparatus and method described above without departing from the scope of the invention as defined in the following claims.

The invention claimed is:

1. A method of installing a ceiling panel comprising the steps of:

arranging at least two elongated members so that they extend obliquely, and in parallel relationship to one another, from a floor to a height underneath, but in close proximity to, a height at which a ceiling panel is to be installed;

providing a panel supporting surface at the upper end of each of said elongated members;

securing the elongated members to a previously erected structure at locations adjacent said height;

sliding a ceiling panel to be installed upward along said elongated members, with a face of the panel in contact with said elongated members, and with the panel having upper and lower edges disposed horizontally;

positioning said upper edge of the panel at a location adjacent said panel supporting surfaces;

while said elongated members extend obliquely from said floor to said height underneath, but in close proximity to, a height at which the ceiling panel is to be installed, tilting the panel upward so that its lower edge moves away from said elongated members until the panel is horizontal and at said height at which it is to be installed;

during, or following the tilting step, moving the panel so that said upper edge slides along said panel supporting surface to a final position; and securing the panel to an overhead support structure.

2. A method of installing a ceiling panel according to claim 1, in which, while the face of the ceiling panel is in contact with the elongated members, the ceiling panel is supported on the elongated members by projections attached to the elongated members and in engagement with said lower edge of the panel.

3. The method of claim 1, in which each said panel supporting surface is a surface of a bracket secured to one of said elongated members at the upper end thereof, and in which the step of securing the elongated members to a previously erected structure is carried out by securing said bracket to said previously erected structure.

4. The method of claim 1, in which, while the face of the ceiling panel is in contact with the elongated members, the ceiling panel is supported on the elongated members by projections attached to the elongated members and in engagement with a said lower edge of the panel, in which the ceiling panel is an elongated panel having opposite parallel, shorter edges and opposite, parallel, longer edges, and in which, prior to said tilting step, the panel is temporarily supported on said elongated members by said projections in engagement with one of its longer edges, with the opposite one of its longer edges in close proximity to the upper ends of the elongated members.

* * * * *